(12) United States Patent
Davis

(10) Patent No.: US 12,403,835 B2
(45) Date of Patent: Sep. 2, 2025

(54) VEHICLE ACCESSIBILITY RAMP

(71) Applicant: Terry Davis, Cohasset, MN (US)

(72) Inventor: Terry Davis, Cohasset, MN (US)

( * ) Notice: Subject to any disclaimer, the term of this patent is extended or adjusted under 35 U.S.C. 154(b) by 434 days.

(21) Appl. No.: 18/052,330

(22) Filed: Nov. 3, 2022

(65) Prior Publication Data
US 2023/0322144 A1 Oct. 12, 2023

Related U.S. Application Data

(60) Provisional application No. 63/329,063, filed on Apr. 8, 2022.

(51) Int. Cl.
*B60R 3/00* (2006.01)
*B60P 1/43* (2006.01)

(52) U.S. Cl.
CPC ............. *B60R 3/007* (2013.01); *B60P 1/433* (2013.01)

(58) Field of Classification Search
None
See application file for complete search history.

(56) References Cited

U.S. PATENT DOCUMENTS

| | | | | |
|---|---|---|---|---|
| 3,493,077 A | * | 2/1970 | Doten ................... | B60R 3/02 182/88 |
| 3,912,298 A | * | 10/1975 | Humphrey .............. | B60R 3/02 182/115 |
| 4,347,638 A | * | 9/1982 | Weaver ................... | B60R 3/02 182/115 |
| 5,653,459 A | * | 8/1997 | Murphy ................. | B60R 3/007 280/166 |
| 5,803,475 A | * | 9/1998 | Dick ..................... | B60R 3/007 280/166 |
| 6,578,666 B1 | * | 6/2003 | Miller .................... | E06C 1/36 182/127 |
| 6,942,271 B1 | * | 9/2005 | Jamison ................ | B60R 3/007 296/61 |
| 7,168,722 B1 | * | 1/2007 | Piotrowski ............. | B60R 3/02 280/166 |
| 8,931,792 B1 | * | 1/2015 | Klassen ................. | B60R 3/02 182/67.4 |

(Continued)

FOREIGN PATENT DOCUMENTS

| CA | 2959180 A1 | * | 4/2016 | .......... A01K 5/0114 |
|---|---|---|---|---|
| CN | 102575452 A | * | 7/2012 | .............. B60R 3/02 |

(Continued)

OTHER PUBLICATIONS

Translated copy of CN-110637741-A (Year: 2025).*

*Primary Examiner* — James A Shriver, II
*Assistant Examiner* — Ian Bryce Shelton
(74) *Attorney, Agent, or Firm* — Brennan, Manna & Diamond, LLC

(57) ABSTRACT

The present invention relates to a vehicle accessibility ramp. The device is an adjustable ramp for loading pets and other animals into a vehicle in an easy and safe way for both the user and animal. This structure includes a plurality of platforms which act as ascending steps for the animal in an easy-to-follow path design. The device has the ability of unfolding into three main platforms with an additional ramp component connecting the ground to the third step platform. Furthermore, the device attaches to a standard square trailer receiver fixture and is easily transportable.

15 Claims, 7 Drawing Sheets

(56) References Cited

U.S. PATENT DOCUMENTS

| | | | | |
|---|---|---|---|---|
| 8,991,842 B1 * | 3/2015 | Teno, III | | B60R 3/02 280/163 |
| 9,308,869 B1 * | 4/2016 | Owens, Jr. | | E04G 1/28 |
| 9,487,147 B1 * | 11/2016 | Morrill | | B60D 1/58 |
| 9,856,654 B1 * | 1/2018 | Tagart | | E06C 1/39 |
| 9,914,397 B2 * | 3/2018 | Hoffman | | B60R 3/007 |
| 10,098,314 B2 * | 10/2018 | Murray | | A01K 1/0272 |
| 11,292,391 B2 * | 4/2022 | Kay | | B60R 3/007 |
| 11,840,197 B2 * | 12/2023 | Niemela | | B60R 11/06 |
| 12,103,343 B1 * | 10/2024 | Rebick | | B60R 3/007 |
| 2005/0212249 A1 * | 9/2005 | Lopez | | B60Q 1/325 280/164.1 |
| 2005/0275187 A1 * | 12/2005 | Chaudoin | | B60R 3/007 280/166 |
| 2008/0150251 A1 * | 6/2008 | Roth | | B60R 3/00 280/166 |
| 2009/0243249 A1 * | 10/2009 | Arvanites | | B60R 3/007 280/166 |
| 2010/0025955 A1 * | 2/2010 | Carr, Jr. | | B60R 3/02 280/166 |
| 2011/0168491 A1 * | 7/2011 | Cheatham, Jr. | | E06C 5/24 280/166 |
| 2013/0015637 A1 * | 1/2013 | Siebrandt | | B60R 3/007 280/495 |
| 2015/0060205 A1 * | 3/2015 | Blackwell | | B60R 3/007 182/223 |
| 2015/0224936 A1 * | 8/2015 | Kichline, Jr. | | B60R 3/02 182/84 |
| 2016/0108629 A1 * | 4/2016 | Feinberg | | B60R 3/007 182/113 |
| 2017/0267181 A1 * | 9/2017 | Hoffman | | B60R 3/007 |
| 2018/0228118 A1 * | 8/2018 | Murray | | A01K 1/0272 |
| 2019/0037799 A1 * | 2/2019 | Murray | | A01K 1/0272 |
| 2019/0202364 A1 * | 7/2019 | Bostwick | | A01K 1/035 |
| 2020/0369211 A1 * | 11/2020 | Kay | | B60R 3/02 |
| 2021/0146842 A1 * | 5/2021 | Niemela | | B60R 9/06 |
| 2021/0261060 A1 * | 8/2021 | Schwarz | | B60D 1/52 |
| 2023/0303002 A1 * | 9/2023 | Kane | | B60R 3/02 |
| 2024/0109494 A1 * | 4/2024 | Niemela | | B60R 3/02 |

FOREIGN PATENT DOCUMENTS

| | | | | | |
|---|---|---|---|---|---|
| CN | 204499054 U | * | 7/2015 | | |
| CN | 108725327 A | * | 11/2018 | | B60P 3/32 |
| CN | 110637741 A | * | 1/2020 | | |
| FR | 2943012 A1 | | 9/2010 | | B60R 3/02 |
| KR | 20160129252 A | * | 11/2016 | | |
| WO | WO-2017002160 A1 | * | 1/2017 | | B60R 3/00 |

* cited by examiner

VEHICLE ACCESSIBILITY RAMP

CROSS-REFERENCE TO RELATED APPLICATION

The present application claims priority to, and the benefit of, U.S. Provisional Application No. 63/329,063, which was filed on Apr. 8, 2022 and is incorporated herein by reference in its entirety.

FIELD OF THE INVENTION

The present invention relates generally to the field of accessibility and assistance devices for use with high profile vehicles such as pick-ups and SUVs. More specifically, the present invention relates to an improved pet assistance attachment that provides users with an easy and efficient way of loading older or heavier dogs, livestock, and other pets safely into their vehicles. Accordingly, the present disclosure makes specific reference thereto. Nonetheless, it is to be appreciated that aspects of the present invention are also equally applicable to other applications, devices, and methods of manufacture.

BACKGROUND

By way of background, this invention relates to improvements in vehicle accessories and attachments that are capable of assisting in the loading of dogs, pets, and other animals into vehicles. Specifically, the present invention provides an efficient ramp having a plurality of steps with a gradual increase in height in between each successive step to allow dogs and other animals to climb safely into the cab, bed or passenger compartment. Devices for safely loading and transporting pets and other animals are generally desirable accessories in the art as they reduce the chance of injuries for the pets and other animals and prevent the animals from scratching the exterior finish of the car as well as pulling off vehicle trim as the animal attempts to gain entry into the vehicle. One particular area of concern is the use of accessory ramps that are not structurally sound or secured securely to the vehicle. A problem with multiple types of these accessibility ramps is that they are lightweight and easy to transport. These features, although desirable, can lead to structural flaws in the build of the ramp. Further, poorly designed accessibility ramps can create dangerous conditions for elderly dogs, other animals or for large animals and those of considerable size and weight. They can also cause damage to the user's vehicle.

Furthermore, owners with multiple dogs, pets, and other animals can struggle with loading multiple animals by themselves. When accounting for different sizes and ages of dogs, it can be difficult to find a ramp, stair or other accessory that accommodates the needs of all the dogs and other animals. Owners who have multiple animals desire a ramp or accessibility accessory that is able to accommodate the various sizes and ages of the animals to be transported by the vehicle operator. Accordingly, people tend to be incredibly careful when transporting their older or larger pet and want to limit the risk of injury for their animal.

Another problem is that people who travel with their pets and other animals like to go to different places with various types of terrain. However, constantly transporting and loading/unloading the animals can be a dangerous and tedious process. Thus, a ramp should be portable so that the person does not find it bothersome to use in different locations. The ramp should also be inexpensive enough to not deter people from purchasing the ramp while still promising a secure structure.

Specifically, the present invention relates to an accessibility accessory for gaining access to the cabins or beds of high-profile vehicles, such as a SUVs or pickup trucks, that may be used by a plurality of different pets, and other animals. The accessibility accessory provides a secure structure to load pets, such as dogs and other animals, in and out of a vehicle. The device is able to unfold into three main steps or platforms with an incline or ramp from the ground to the first step platform. Furthermore, the device attaches to a standard trailer hitch configuration and is easily transportable.

Therefore, there exists a long-felt need in the art for a high-profile vehicle loading accessory that provides owners with a secure way to load and transport their pets and other animals into a vehicle. There is also a long-felt need in the art for an accessibility accessory device that allows users to quickly get their animal in the vehicle in case of danger. Further, there is a long-felt need in the art for a vehicular accessibility accessory device that provides a set of folding steps for the animal to use to climb into the vehicle. Moreover, there is a long-felt need in the art for a device that keeps the accessibility accessory ramp secured to the vehicle to prevent any collapse or failure of the structure. Further, there is a long-felt need in the art for an accessibility accessory ramp having a folding frame that can be folded into two platforms to secure the accessory while traveling. Finally, there is a long-felt need in the art for a vehicle pet lift device that includes a convenient trailer hitch or an adaptor for an existing hitch for easy transportation.

The subject matter disclosed and claimed herein, in one embodiment thereof, comprises an accessibility accessory ramp for use with high-profile vehicles. The device is a folding set of stairs for safely and easily loading dogs of all sizes and ages into a high profile vehicle. The device includes a square-shaped base component of steel, metal, or other rigid material such as fiberglass, composites or plastic which attaches to the vehicle at the positions where a trailer hitch would usually be provided on the vehicle. The device further includes a two-step deck above the level of the hitch. The two-step deck either has a ramp piece, incline or a step that folds down to reach the ground.

In this manner, the vehicle accessibility accessory ramp of the present invention accomplishes all of the foregoing objectives and provides users with a device that is capable of loading pets and other animals safely into the back of a high-profile vehicle, such as a SUV or pickup truck. The invention allows a user to safely board older animals into a vehicle without injury. The device allows users to transport multiple pets or other animals of different sizes and weights without lifting any of the animals manually. Finally, the device encourages the animals to use the ramp by having a compact and a gradually inclined structure.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an accessibility accessory ramp device for high-profile vehicles. The device is a folding set of stairs or platforms for safely and easily loading animals of all sizes and ages into the cabin, passenger compartment, or bed of a high-profile vehicle. The invention includes a plurality of square-shaped platforms made of steel, metal, composites, fiberglass, high-strength plastics, or combinations thereof which attach to the vehicle at the frame where the fixture that a trailer hitch would typically be located. The accessibility accessory has at least a first platform disposed at a first height and a second platform provided at a second height which is lower than the first height. The device further includes positioning a two-step deck above the position of the trailer hitch or connection point. The two-step deck either has a ramp piece, incline or a third step or platform that folds down to ground level and is provided at a third height, which is less than the first and second heights of the first and second platforms. Each of the platforms may be provided with a rubberized or other non-slip surface to assist the animal in gaining access to the vehicle. In addition, a removable screen is provided and may be inserted behind the device to help pets that will not use stairs as they can see through the stairs they are being asked to climb.

The present invention provides a structurally sound accessibility ramp for animals to use when climbing into a vehicle. The animal or pet ramp is adjustable and may be used with animals of different sizes and ages. The adjustability is accomplished by providing the top platform as well as a two-step deck which folds down to the ground level using hinges. A retaining device, such as a locking pin, is used to maintain the position of the two-step deck component against the force of the animal when standing on one or more of the platforms and entering the vehicle.

In one embodiment, the top platform comprises a square-shaped platform which is welded to the upper portion of the frame of the ramp. Specifically, the top platform includes a frame with two legs with U-shaped frames. Further, when the two-step deck is unfolded, the top layer is elevated by a height of roughly 6" from the second platform.

In another embodiment, the two-step deck component includes a middle platform which is directly welded to an adaptor for a trailer hitch so that it is readily removable from the vehicle when not in use. This middle platform is even with the bottom of the top platform's legs, roughly 6" below the top of the highest platform and approximately equal with the lower edge of the vehicle bumper. This middle platform in size is roughly 2' square. The two-step deck also includes a third platform 1520 of similar size which rests on top of the middle platform in its stored position. The third platform 1520 has collapsible legs allowing the user to fold the two-step deck into a compact stack. The third platform 1520 rotates down to the ground to the right of the first two platforms when facing the vehicle. These two platforms compose the two-step deck component and are connected by one or more metal hinges and rods. The third platform 1520 also includes a fourth component 1540 which acts as a slanted ramp piece which connects the third platform 1520 to the ground. The ramp piece is connected by two hinges to the third platform 1520. When stored away for transporting, the ramp folds over and on top of the third platform 1520. Additionally, any other suitable securing means as is known in the art can be utilized to secure the two-step deck components together when traveling.

In one embodiment, the top of all three platforms are covered with a waterproof and non-slip material such as Polyurethane or a rubber with a pattern of undulating ridges and valleys. Further, the platforms may have designs which would allow for better gripping by the animals to use when climbing the ramp. These features are for protecting the animal from slipping and injuring itself.

Further, the platforms may have 1 cm wide slits in the floor to allow rain to drain through and to keep the platforms dry to provide safe conditions for the animal.

In one embodiment, the accessibility ramp device has reflective strips, such as conspicuity tape attached to metal rods and legs of multiple platforms to create a line of the strips. In this embodiment, the reflective strips or conspicuity tape allow other vehicles to see the whole unit and extension from the vehicle when the invention is installed. The strips are roughly two feet from the bumper of the vehicle it is attached to.

In yet another embodiment, the frame of the accessibility ramp is made of stainless steel or aluminum. These materials are more resistant to rust and still maintain a strong stability. The ramp is designed to be similar to a trailer and will have to undergo harsh weather conditions.

In yet another embodiment, the accessibility ramp comes with a rain tarp or cover to protect the device from rusting and cracking when the invention is not in use.

In yet another embodiment, a method of securing the accessibility ramp in position for storage is described. The method includes the steps of providing a means of fastening the platforms of the accessibility ramp together to prevent any movement when being transported. The method comprises a ratchet strap that is attached to the trailer's frame and can be used to wrap around the whole device and tightened. Further, the method includes a means of securing the accessibility ramp to the vehicle via a locking pin system with the trailer hitch. The locking pin feeds through the trailer hitch and locks the accessibility ramp to the vehicle's trailer receiver hitch.

In yet another embodiment of the present invention, the accessibility ramp has an adjustable basket attachment to hang a set of water bowls from one of the platforms such that it may be used by the pets or other animals being transported by the individuals. The basket includes a set of hooks to be hung onto the frame of the device. The hooks would then be attached to two rods that extend downward roughly 6-8 inches and can hold two watering bowls of relative size. The watering or food bowls are out of the way of the ramp and cannot be easily knocked off when the ramp is in use.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
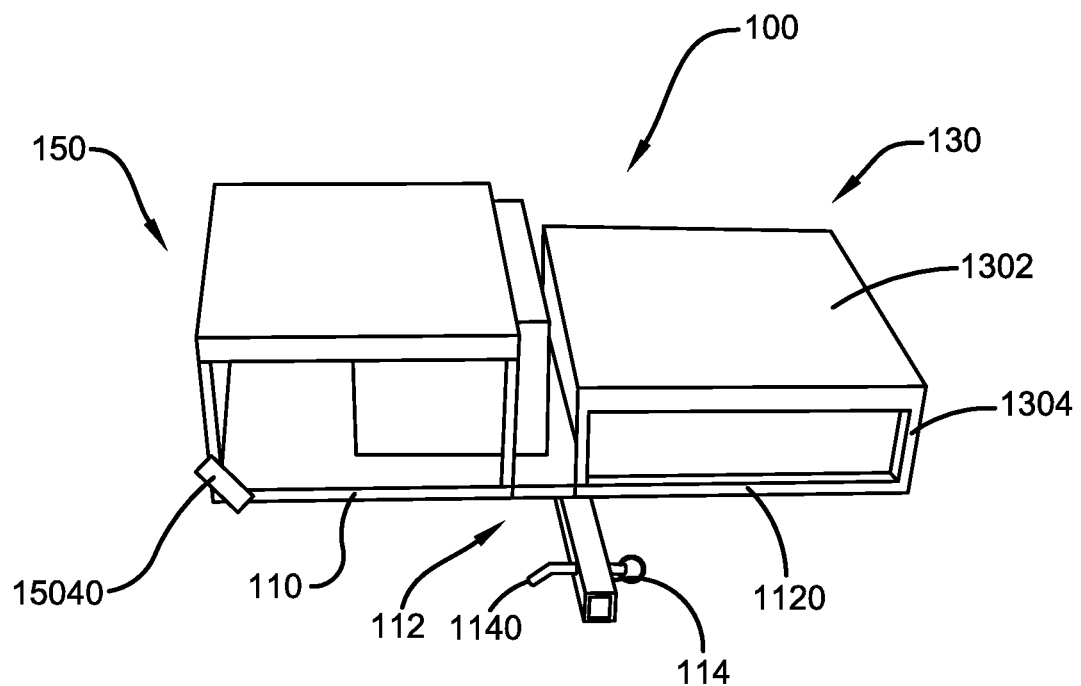
FIG. 1 illustrates a perspective view of one potential embodiment of the accessibility ramp of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for accessibility ramp for high profile vehicles that provides owners with a secure way to load and transport their pets and other animals into the vehicle. There is also a long-felt need in the art for a pet ramp device that allows users to quickly get their animal in the vehicle in case of danger. Further, there is a long-felt need in the art for a vehicular pet ramp device that provides a set of folding steps for the animal to use to climb into the vehicle. Moreover, there is a long-felt need in the art for a device that keeps the pet ramp secured to the vehicle to prevent any collapse of the structure. Further, there is a long-felt need in the art for a pet ramp device with a folding frame that can be folded into two platforms for traveling. Finally, there is a long-felt need in the art for a vehicle pet assist device that includes a convenient trailer hitch for easy transportation.

The present invention, in one exemplary embodiment, is an accessibility ramp. The device is a transformable ramp for safely loading pets and other animals in and out of a vehicle. The device includes a staircase configuration having a plurality of square-shaped platforms made of steel, metal, fiberglass, composites, rigid plastic material or combinations thereof which attach to the vehicle at the trailer hitch fixture. The device further includes a two-step deck where the upper platform is above the hitch level. The two-step deck either has a ramp piece or a step that folds down to ground level. Further, the device has a base attached to a trailer hitch point and would be placed into a receiver fixture of a vehicle similar to attaching a trailer.

Referring initially to the drawings, FIG. 1 illustrates a perspective view of one embodiment of the accessibility ramp 100 of the present invention. In the present embodiment, the accessibility ramp 100 is an improved vehicle ramp or stair that provides users with a way of securely loading pets and other animals in and out of a vehicle. The device 100 is especially designed to allow animals and pets to load into a vehicle safely. More specifically, the device 100 has a rectangular-shaped frame 110 made of a rigid material such as steel, metal, fiberglass, composite materials or combinations thereof. The rectangular frame 110 has a base 112 which includes two longitudinal members 1120 (see FIG. 2A) connected by two cross members 1122. Both longitudinal members 1120 are roughly 3' to 4' in length and run parallel to each other. They are separated by the two cross members 1122 that run perpendicular to the longitudinal members 1120 and which are roughly 1' to 2' in length. The dimensions may be changed based on the vehicle type that the accessibility assist is used with. The frame also includes a trailer hitch adaptor 114 that inserts into a receiver fixture on a vehicle. The trailer hitch 114 has a pin lock system 1140 for securing the accessibility ramp 100 to a vehicle. The pin lock system 1140 may use a metal pin such as a carter pin to hold the hitch adaptor in place in the hitch on the vehicle. The trailer axle 114 is a three-dimensional rectangle that acts as a main cross member for the frame 110, specifically for the longitudinal members 1120. The trailer hitch 114 is roughly 2' 6" long and may be modified depending on the vehicle size. This size may vary depending on various preferences of the user while maintaining a functioning product. The accessibility access ramp of the present invention may also be produced in a color which matches the exterior of the vehicle.

The accessibility ramp 100 has two main components. The first component is the top platform 130. The top platform 130, also referred to as the first platform, includes a roof or top surface 1302 and four vertical legs 1304. The roof or top surface 1302 is made of a heavy plastic or metal and is directly attached to the four legs 1304. The top surface 1302 may be removable and reversible as will be discussed in connection with FIG. 8. The roof or top surface 1302 can be coated with a waterproof and/or rubberized, non-slip material to prevent an animal from injuring itself. The four legs 1304 are roughly 8-10" in height and branch off of the two longitudinal members 1120 from the base 112. These dimensions can vary depending on the size or age of the animals utilizing the ramp.

The second component is the two-step deck 150. The two-step deck 150 is made up of a middle or second platform 1500, a third platform 1520, and a fourth platform or ramp piece 1540. All of the components that make up the two-step deck component 150 are connected via hinges. The middle or second platform 1500 has a roof or top surface 1502 which sits directly on the longitudinal members 1120 of the base 112. The roof or top surface 15020 is made of a heavy plastic or metal. The roof or top surface 1502 is roughly 2' square and roughly 1 cm in thickness and may include a removable or reversible surface. These dimensions are adaptable to a certain point to fit the preferences of the user and vehicle type. The legs 1504 are connected by two-way connecting hinges 15040 which connect the top of the legs 1504 to the longitudinal members 1120. The third platform 1520 has a roof surface 15200 and legs 15220. The roof surface 15200 is roughly 2' square and roughly 1 cm in thickness. The third platform 1520 has four legs 15220 all 8-10" tall. Two of the legs are connected by two-way hinges 15222 and connect the bottom of the legs to the bottom of the middle platform legs 1504. The fourth platform 1540 is stored on the underside of, or beneath, the third platform's roof surface 15200. It is connected by a pair of hinges 15222 and can be folded out to work as a slanted platform for smaller or older animals to use to get off the ground.

In one embodiment, all four platforms have roughly equivalent sized roof surface components. The dimensions of the platforms range from 1'9" squared 2' square, 2'3" square, or any other suitable size or shape as is known in the art, depending on the preferences of a user and vehicle type. Further, the leg components 1304, 1504, and 15220 can vary in height. The legs can be 6" in height, 8", 10", 12", or any other suitable size as is known in the art, depending on the preferences of a user and the vehicle type. Generally, the device 100 can be any suitable size and/or shape as is known in the art, with larger sizes for supporting larger animals or older pets, and smaller sizes for supporting small pets, or less agile ones.

Figure 2A:
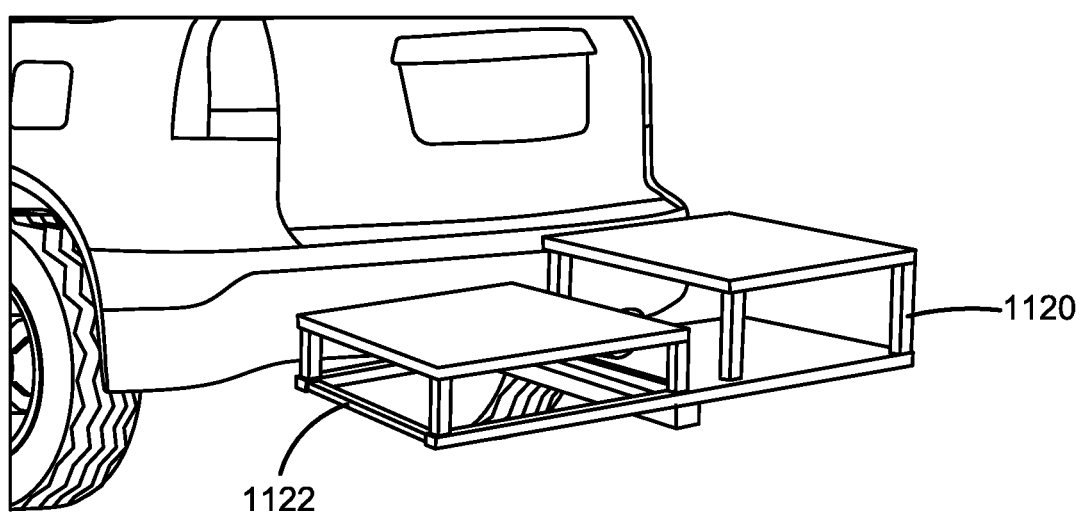
FIG. 2A illustrates a perspective view of one potential embodiment of the accessibility ramp of the present invention with the invention attached to vehicle in accordance with the disclosed architecture.
Figure 2B:
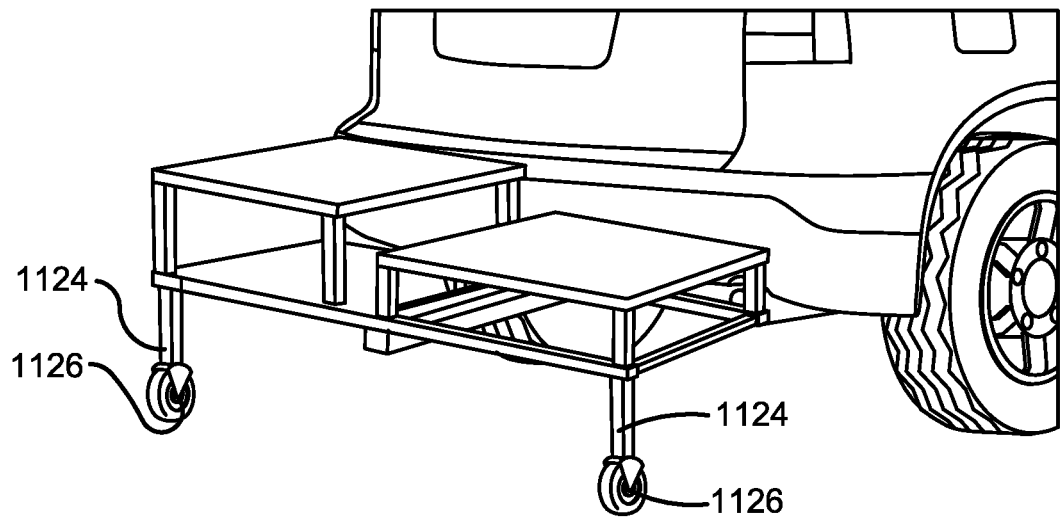
FIG. 2B illustrates a perspective view of one potential embodiment of the accessibility ramp of the present invention in a wheeled embodiment in accordance with the disclosed architecture.

In FIG. 2B, another embodiment is described in which the accessibility ramp 100 comes equipped with a pair of wheels 1126 to support the frame 110. The wheels 1126 are attached to the frame 110 by two metal rods that comprise the wheel axle (1124), and that relieves tension on the trailer hitch 114 when the ramp is being used. The wheels 120 act as additional support and can be kept down or flipped up when the vehicle is in operation. The wheel's diameter can measure 1'3", 1'6", 1'9", 2' or any other suitable size as is known in the art, depending on the preferences of a user or the vehicle type.

Figure 2C:
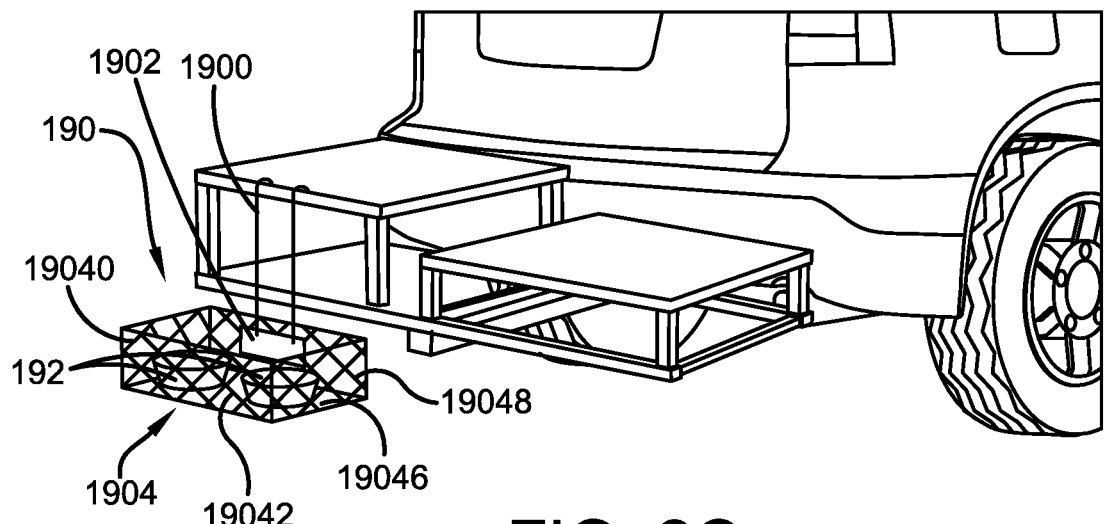
FIG. 2C illustrates a perspective view of one potential embodiment of the accessibility ramp of the present invention where one or more bowls are supported from the accessibility ramp in accordance with the disclosed architecture.

As shown in FIG. 2C, the longitudinal member 1120 which is part of the frame 110, is used to attach the hanging box 190. The hanging box 190 has two J-shaped hooks 1900 which hang from the longitudinal member 1120. The hooks 1900 are attached to a rectangular shaped box 1904 and are connected by a small metal bracket 1902. The box's dimensions are roughly 9"×5"×4", or or any suitable size as is known in the art, depending on the preferences of a user. The box 1904 has an exterior surface 19040. The box's surface 19040 can be composed of treated wood or plastic. The box 1904 has a bottom 19046 and both longitudinal walls 19042, as well as lateral walls 19048. The box's walls are either glued together or all conjoined depending on the material chosen. The hanging box 190 serves as an easy way of feeding and hydrating the animals before they get back into the car. The whole hanging box 190 can be easily removed and stored away in the interior of the car.

Furthermore, the longitudinal member 1120 furthest from the vehicle has a set of reflective strips 170 such as conspicuity tape. The reflective strips 170 allow cars traveling behind to see the accessibility ramp 100 extending from the user's vehicle. The strips are roughly two feet from the bumper of the vehicle it is attached to.

Figure 3:
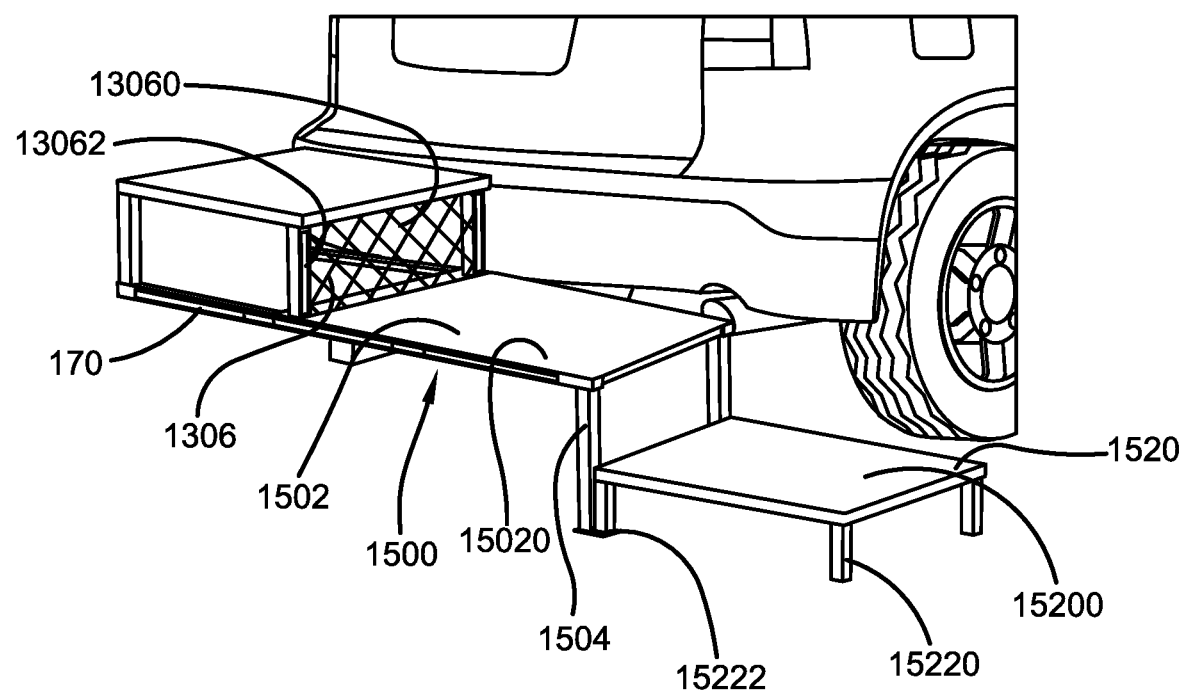
FIG. 3 illustrates a perspective view of one embodiment of the accessibility ramp of the present invention with the ramp transformed into three main platforms in accordance with the disclosed architecture.

As shown in FIG. 3, the top platform 130 has a roof or top surface 1302 and a plurality of legs 1304. The top platform 130 also has a safety side wall 1306 which acts as a cover for the gap between the top platform 130 and the middle or second platform 1500, when the two-step deck 150 is extended downward. The safety side wall 1306 has an exterior surface 13060 and a set of magnets 13062. The exterior surface can be manufactured from a heavy plastic, fiberglass, composite, metal material or combinations thereof. A set of magnets would be attached to the inside of the wall 1306 and have their opposite pole attached to two legs 1304 of the top platform 130. This would prevent an animal from overstepping the platform and catching one of its limbs in a hole possibly causing them to fall. The safety wall 1306 would only be able to be pulled off and not pushed through the gap since the dimensions of the components are barely larger than the gap.

Figure 4A:
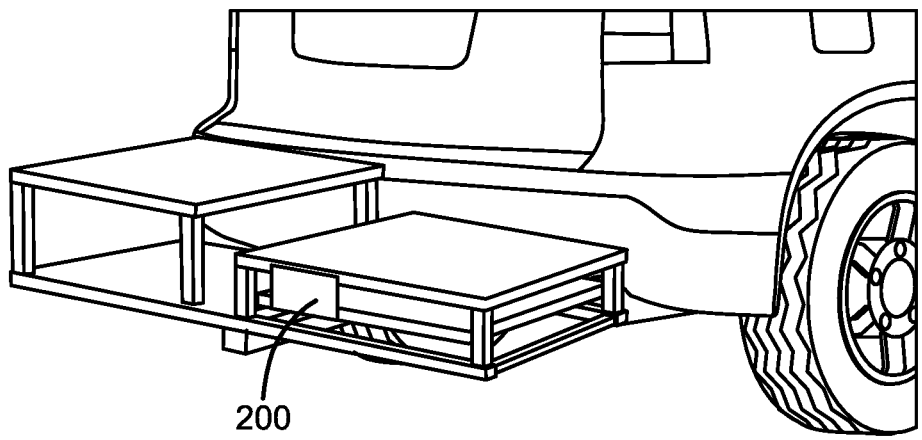
FIG. 4A illustrates a perspective view of one embodiment of the accessibility ramp of the present invention comprising the two-step deck component folded into storage mode in accordance with the disclosed architecture.

FIG. 4A shows the accessibility ramp 200 in a first, folded configuration (as also seen in FIGS. 1 and 2A) and attached to the back of the vehicle. In the storage position, the invention may be used to hold other cargo like coolers, luggage, tents, pet kennels or pens when the animals are in the vehicle and there is no longer space to hold items which are normally carried in the interior of the vehicle.

Figure 4B:
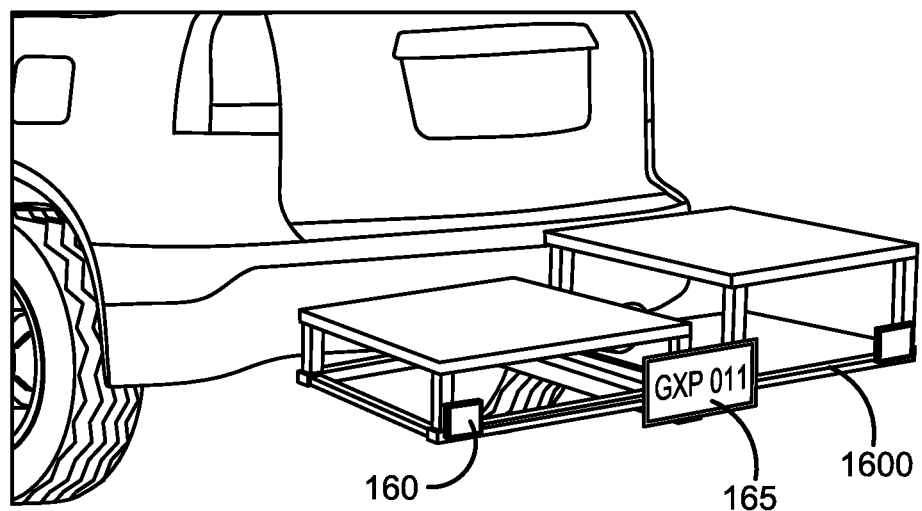
FIG. 4B illustrates a perspective view of one potential embodiment of the accessibility ramp of the present invention comprising taillights or warning lights and a license plate arrangement in accordance with the disclosed architecture.

As shown in FIG. 4B, a set of brake lights 160 is present on the ends of the exterior longitudinal member 1120. The lights 160 measure roughly 6" in height and 4" in width. The electrical wires 1600 that power said lights run along the longitudinal member 1120 eventually meeting on both sides at the trailer axle 114. The wiring 1600 then runs along the trailer axle 114 to the vehicle's wiring connector.

Furthermore, FIG. 4B shows the accessibility ramp device 100 with a license plate frame 165 which is mounted to the anterior longitudinal member 1120. This feature would be ideal for users who travel with the invention 100 attached to their vehicle frequently as the license plate would then be obscured by the invention potentially putting operation of the vehicle outside of compliance with motor vehicle laws.

Figure 5:
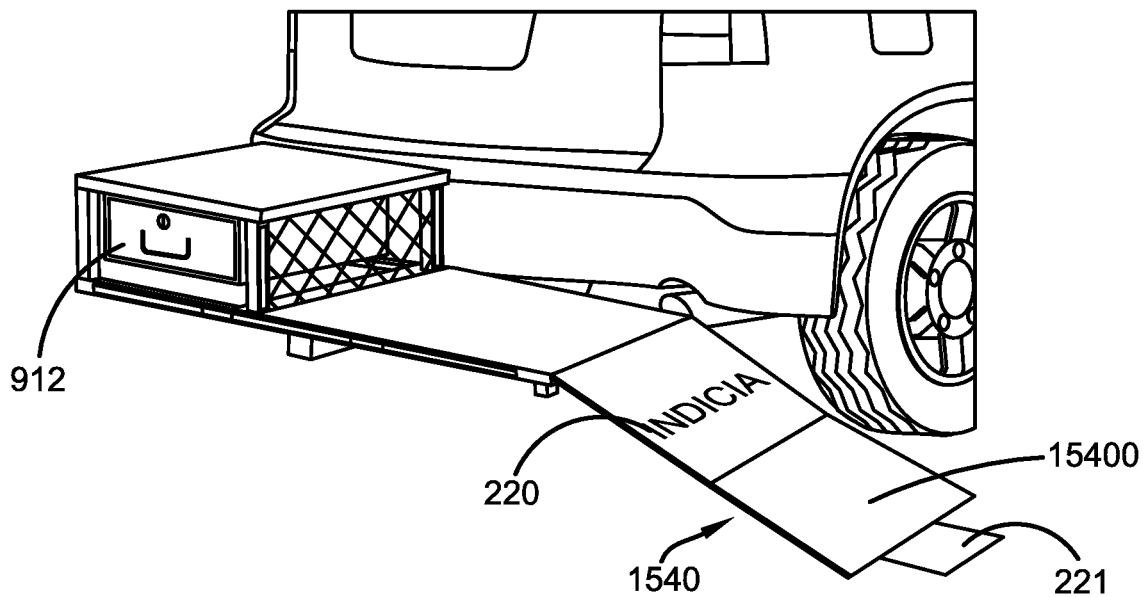
FIG. 5 illustrates a perspective view of one potential embodiment of the accessibility ramp of the present invention disclosing the two-step deck fully extended to ground level in accordance with the disclosed architecture.

As shown in FIG. 5, the accessibility ramp in shown in a second or extended position which is also seen in FIG. 3. The accessibility ramp device 100 is manufactured from treated wood, metal, carbon fiber, aluminum, steel, titanium, PVC, iron, and plastic, etc., or any other suitable material as is known in the art. The accessibility ramp 100 may also include a stabilizing step plate 221 which may be placed near the ramp portion to allow the pet owner to stand on the plate 221 to further stabilize the accessibility ramp 100 when the pet is climbing up the device.

In yet another embodiment, the accessibility ramp device 100 includes a plurality of indicia 220. Specifically, the frame component 110 of the device 100 may include advertising, a trademark, or other letters, designs, or characters, printed, painted, stamped, or integrated into the base component 112 or longitudinal members 1120, or any other indicia 220 as is known in the art. Specifically, any suitable indicia 220 as is known in the art can be included, such as, but not limited to, patterns, logos, emblems, images, symbols, designs, letters, words, characters, animals, advertisements, brands, or combinations thereof, that may or may not be animal or pet brand related.

In use, the vehicle ramp device 100 is adjustable, such that it can be extended into several stairs and platforms. Users unlatch the transportation lock 200 and extend the two-step deck component 150 outward, revealing a set of steps. Further, the invention 100 provides a set of wide and sturdy platforms (130, 1500, 1520, 1540) that prevent pets from falling off and injuring themselves. The device 100 is also easily accessible due to it being stored on a trailer hitch 114 which can remain there when the car is moving.

Figure 6:
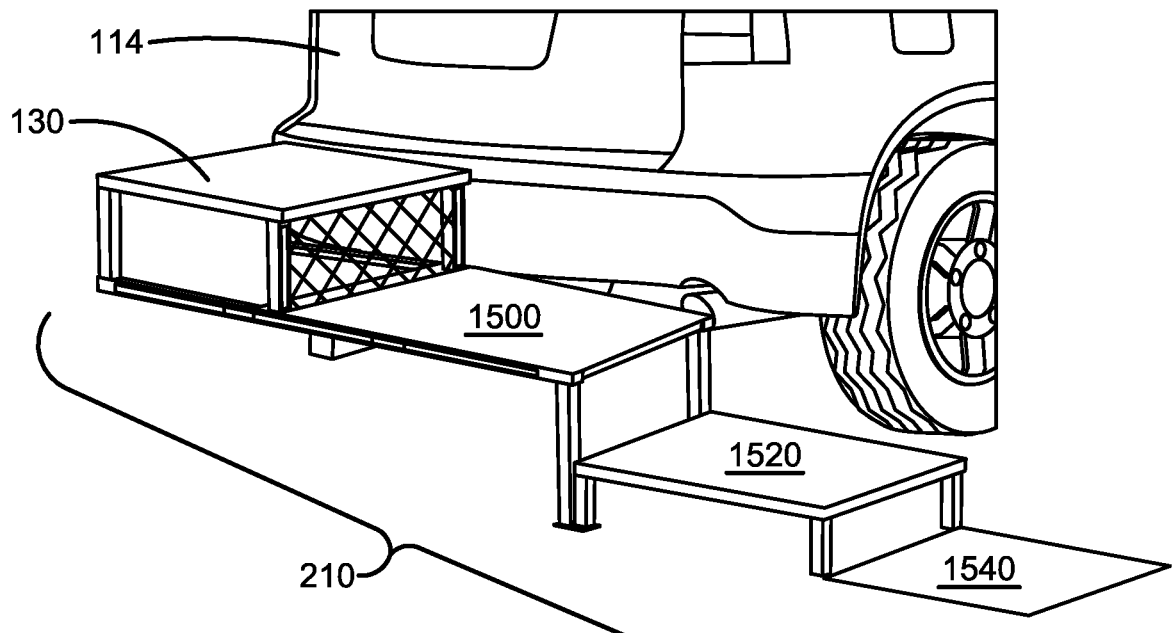
FIG. 6 illustrates one potential method of using the ramp device of present invention in accordance with the disclosed architecture.

A method 210 of deploying the accessibility ramp of the present invention to its multiple possible positions is described in FIG. 6. The folding method 220 includes the initial step of providing the device 100 extending directly outwards from the vehicle. This method would deploy the platforms (130, 150, 1500, 1520, 1540) into an array of descending platforms. The method provides a safer route for pets or other animals to take when entering the vehicle and offers a straightforward and easy to follow path for the pets or other animals. This method 220 could very well alter the dimensions or functionality of components that make up the device 100.

Figure 7:
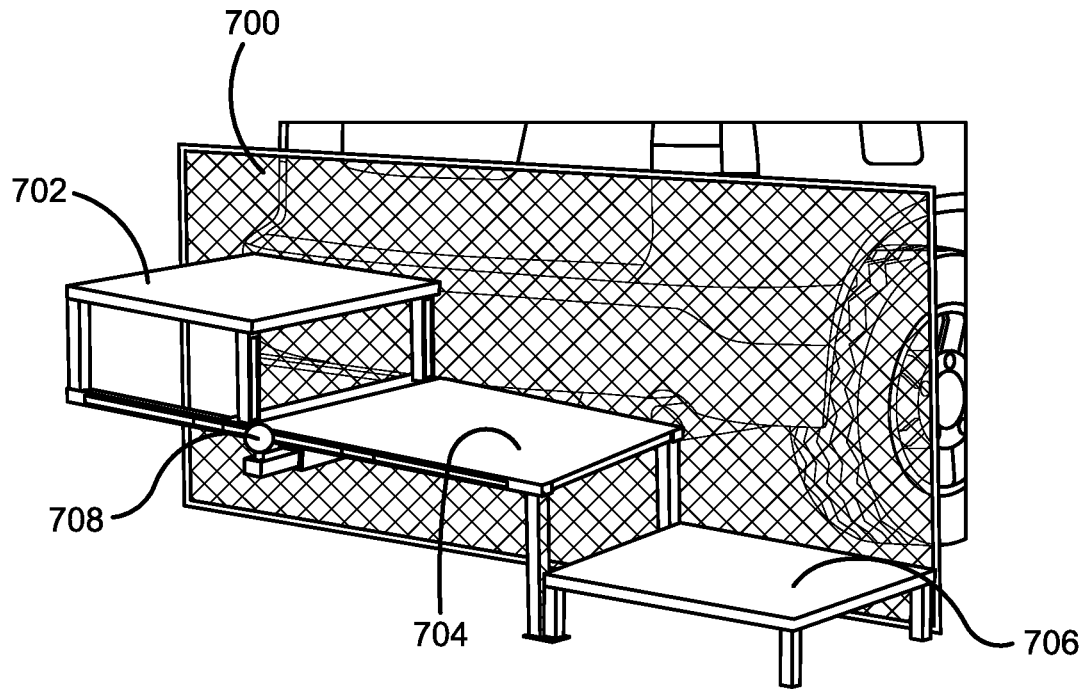
FIG. 7 illustrates a perspective view of one potential embodiment of the accessibility ramp of the present invention with a screen set up behind the accessibility ramp in accordance with the disclosed architecture.

FIG. 7 depicts an additional embodiment of the present invention. Some pets may be hesitant to walk upstairs or a ramp where they can see through the stairs. In the present embodiment, a removable screen 700 is placed on the back and from the sides of the accessibility ramp platforms, 702, 704 and 706 so as to appear that the platforms are in an enclosed configuration and there are no or limited openings for the pet to be concerned with. Cutouts may be provided for the trailer hitch 708 so that the screen 700 easily fits around the hitch.

Figure 8:
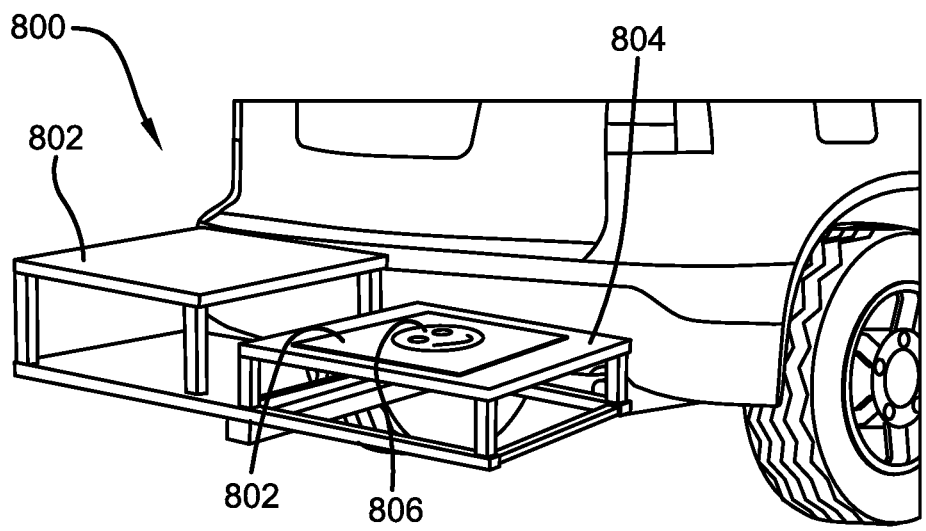
FIG. 8 illustrates a perspective view of one potential embodiment of the accessibility ramp of the present invention with a removable pad for the platforms of the accessibility ramp in accordance with the disclosed architecture.

FIG. 8 provides an embodiment in which there is a removable or reversible top surface 802 for at least one of the platforms 800, if not for each of the platforms 800 of the accessibility ramp. Providing a removable top allows the platforms to be cleaned, changed, or replaced as needed. In addition, the removable or reversible top surface 802 can provide additional flexibility for the type of surface to be used, e.g., a non-slip surface, textured surface, carpeted or padded surface or some combination. The top surface 802 may have extensions 804 surrounding the surface to form a short wall around the surface which can be used to help guide the animal. In another position, the extensions 804 which are generally perpendicular to the surface 802 may be used to hold cargo in place on the ramp when the ramp is in the stored position. FIG. 8 also shows the use of indicia 806 which can be any graphical or other indicia on the top surface so as to personalize the accessibility ramp for the user's preference.

Figure 9:
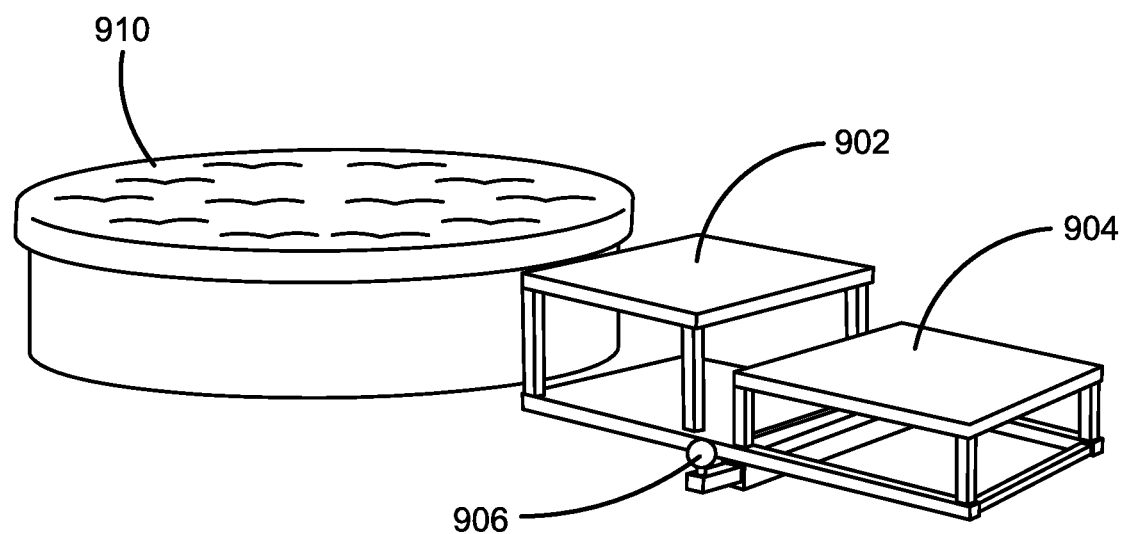
FIG. 9 illustrates a perspective view of one potential embodiment of the accessibility ramp of the present invention used to allow pets and other animals to climb onto a bed or other furniture so that the accessibility ramp can be used both for purposes of traveling, as well as for home use.

FIG. 9 shows the accessibility ramp platforms 902 and 904 with the trailer hitch 906 used to allow pets and other animals to climb onto a bed 910 or other furniture so that the accessibility ramp can be used both for purposes of traveling as well as for home use.

In a further embodiment, the device 100 may also include a locking drawer or cabinet 912 positioned under the fixed, non-moveable step. The cabinet 912 may be used to store pet supplies or any other useful items.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "accessibility ramp device", "vehicle ramp device", and "device" are interchangeable and refer to the accessibility device 100 of the present invention.

Notwithstanding the foregoing, the accessibility device 100 of the present invention can be of any suitable size and configuration as is known in the art without affecting the overall concept of the invention, provided that it accomplishes the above-stated objectives. One of ordinary skill in the art will appreciate that the accessibility device 100 as shown in FIGS. 1-9 are for illustrative purposes only, and that many other sizes and shapes of the accessibility device 100 are well within the scope of the present disclosure. Although the dimensions of the accessibility device 100 are important design parameters for user convenience, the accessibility device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such a term is intended to be inclusive in a manner similar to the term "comprising" as "comprising" is interpreted when employed as a transitional word in a claim.

What is claimed is:

1. An accessibility steps comprising:
   a frame, wherein the frame comprises a first platform having a rubberized waterproof coated top surface and disposed of at a first height;
   a locking cabinet positional under the first platform;
   a second platform having a top surface and disposed at a second height different than the first height and connected to the first platform;
   a third platform having a top surface and disposed at a third height different than the first and second heights and connected to the second platform;
   each of the heights of the second and third platforms is less than the height of the first platform;

wherein the frame further comprises a plurality of cross members and a plurality of longitudinal members; and wherein each of the second and third platforms further comprise longitudinal support members that are capable of contacting a ground surface; and wherein the first platform further comprises a safety sidewall configured to cover a gap between the first and second platforms.

2. The accessibility ramp steps as recited in claim 1, wherein the third platform is folded onto the second platform to provide a storage position.

3. The accessibility steps as recited in claim 1 further comprising a trailer hitch adaptor connected to one of the plurality of cross members for removably connecting the accessibility steps to a vehicle.

4. The accessibility steps as recited in claim 3, wherein the vehicle is a high-profile vehicle.

5. The accessibility steps as recited in claim 3, wherein the hitch adaptor connects to a trailer hitch on the vehicle and is held in position by a locking pin.

6. The accessibility steps as recited in claim 1 further comprising a removable surface cover for at least one of the first, second and third platforms.

7. The accessibility steps as recited in claim 6, wherein the removable surface cover is comprised of a non-slip, textured, carpeted or padded surface.

8. The accessibility steps as recited in claim 1, wherein each of the first, second and third platforms is manufactured from one of a steel, a metal, a composite material, a fiberglass, a high-strength plastic or a combination thereof.

9. The accessibility steps as recited in claim 1 further comprising a hanging box removably attached to the frame.

10. The accessibility steps as recited in claim 9, wherein the hanging box comprises one or more bowls for feeding or watering a pet or other animal.

11. The accessibility steps as recited in claim 1 further comprising a reflective tape positioned along a portion of the frame.

12. A pet steps for use with a vehicle, the pet ramp comprising:

a frame comprised of longitudinal members and cross members for supporting a first platform comprising a rubberized waterproof coated top surface;

a second set of cross members for supporting a second platform;

a safety sidewall magnetically attachable to the first platform;

a third set of cross members for supporting a third platform that is hingedly attached to the second platform and that is repositionable from a first storage position to a second extended position;

a second set of longitudinal members for supporting the second platform;

a third set of longitudinal members for supporting the third platform;

a hitch adaptor connected to the frame to removable connect the frame to the vehicle, wherein the first platform is disposed at a different height than each of the second and third platforms; and a removable screen cutout to fit around the hitch adapter and attachable to a back of the frame.

13. The pet steps for use with a vehicle as recited in claim 12 further comprising a removable surface cover for each of the first, second and third platforms.

14. The pet steps for use with a vehicle as recited in claim 13, wherein the removable surface cover comprises a non-slip, textured, carpeted or padded surface.

15. The pet steps for use with a vehicle as recited in claim 13 further comprising an indicia positioned on the removable surface cover.

* * * * *